United States Patent
Högberg et al.

(10) Patent No.: US 6,427,553 B1
(45) Date of Patent: Aug. 6, 2002

(54) MANEUVERING DEVICE

(75) Inventors: Dan Högberg, Skövde; Kenneth Skogward, Huskvarna, both of (SE)

(73) Assignee: Kongsberg Automotive AB (SE)

( * ) Notice: Subject to any disclaimer, the term of this patent is extended or adjusted under 35 U.S.C. 154(b) by 0 days.

(21) Appl. No.: 09/701,995

(22) PCT Filed: Jun. 10, 1999

(86) PCT No.: PCT/SE99/01014

§ 371 (c)(1),
(2), (4) Date: Dec. 6, 2000

(87) PCT Pub. No.: WO99/67552

PCT Pub. Date: Dec. 29, 1999

(30) Foreign Application Priority Data

Jun. 11, 1998 (SE) ............................................. 9802105

(51) Int. Cl.⁷ ................................................. G06F 1/16
(52) U.S. Cl. .............................. 74/471 XY; 74/473.33; 200/5 R; 200/6 A; 345/161
(58) Field of Search ................................. 345/156, 157, 345/161, 160, 167; 200/4, 5 R, 6 A, 17 R, 18, 332, 335; 74/471 XY, 473.3, 473.33, 473.34

(56) References Cited

U.S. PATENT DOCUMENTS

| | | | | |
|---|---|---|---|---|
| 4,656,960 A | * | 4/1987 | Davenport | 74/471 XY |
| 5,362,269 A | * | 11/1994 | Leach | 74/480 B |
| 5,396,266 A | * | 3/1995 | Brimhall | 74/471 XY |
| 5,640,179 A | * | 6/1997 | Lake | 345/161 |
| 5,790,101 A | * | 8/1998 | Schoch et al. | 345/161 |
| 5,883,690 A | * | 3/1999 | Meyers et al. | 345/161 |
| 5,949,404 A | * | 9/1999 | Zabel | 345/161 |
| 6,030,291 A | * | 2/2000 | Maki et al. | 345/161 X |
| 6,059,660 A | * | 5/2000 | Takada et al. | 345/161 X |
| 6,072,131 A | * | 6/2000 | Dorey | 200/318 |
| 6,205,021 B1 | * | 3/2001 | Klein et al. | 345/167 X |
| 6,215,472 B1 | * | 4/2001 | Chen | 345/161 |
| 6,232,959 B1 | * | 5/2001 | Pedersen | 345/161 |
| 6,301,987 B1 | * | 10/2001 | Chakri et al. | 74/473.3 |

FOREIGN PATENT DOCUMENTS

JP       2000-357019       * 12/2000

* cited by examiner

Primary Examiner—Lenard A. Footland
Assistant Examiner—Colby Hansen
(74) Attorney, Agent, or Firm—Lerner, David, Littenberg, Krumholz & Mentlik, LLP

(57) ABSTRACT

A control device is disclosed comprising a console, a control lever mounted on the console, a pivot for moving the control lever relative to the console between at least two different operating modes, one in which the control lever can be moved between a first group of operating positions and another in which the control lever can be moved between a second group of operating positions. In the first operating mode, the control lever can be swiveled in a reference plane, and in the second operating mode the control lever can be elevated relative to the reference plane and can be moved like a joystick between the second group of operating positions.

6 Claims, 11 Drawing Sheets

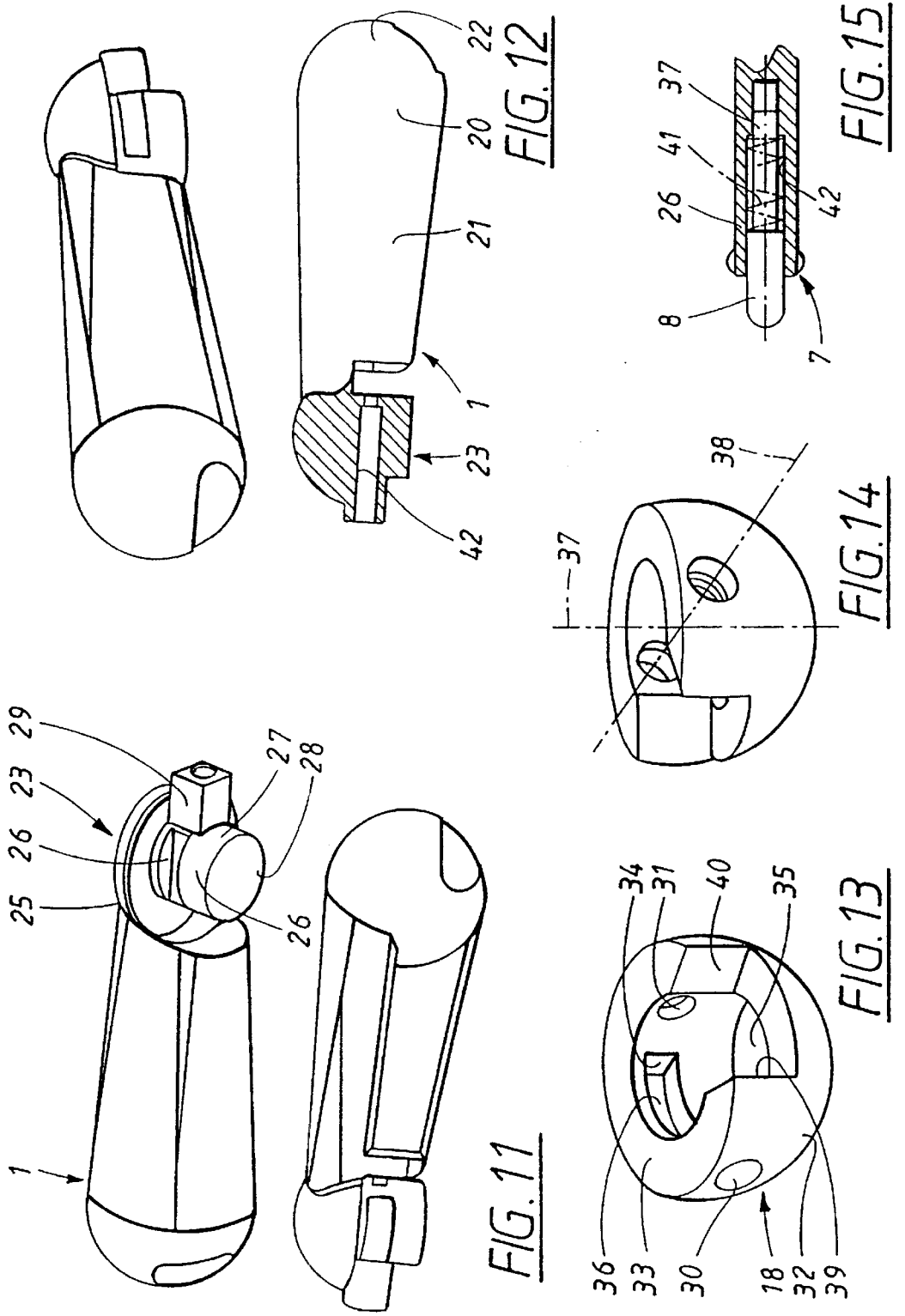

MANEUVERING DEVICE

FIELD OF THE INVENTION

The present invention relates to a control device.

BACKGROUND OF THE INVENTION

With control devices of the usual type, such as gear controls for motor vehicles, a gear lever incorporated in the device can be set in a number of different positions which determine a certain operating state of the device, for example a gearbox, which is to be controlled. By this means the operating state of the lever is transferred to the device which is to be controlled by means of a transmission device, for example in the form of a cable, linkage, hydraulics or electrical signals. For certain types of control it can be desirable for a first transmission device not to be activated, but for the position of the control lever to be transferred by means of a second transmission device. In this case with a traditional control device the first transmission device must be disconnected when the second transmission device is connected, which results in a complicated mechanism. In addition the difference in the lever position in different operating states is so small that the positions must be clearly indicated and detected.

One of the objects of the present invention is to produce a control device which is ergonomically correct and which by means of its character shows the selected operating state.

SUMMARY OF THE INVENTION

In accordance with the preseent invention, this and other objects have now been realized by the invention of a control device comprising a console, a control lever mounted on the console, at least one pivot device enabling the control lever to pivot relative to the console to change between a number of operating positions where the operating positions of the control lever around the at least one pivot device are intended to be transferred to a corresponding operating state of a device which is to be controlled, the operating positions comprising at least two different operating modes, including a first operating mode in which the position of the control lever can be changed by moving the control lever between a first plurality of operating positions, and a second operating mode in which the position of the control lever can be changed by moving the control lever between a second plurality of operating positions and wherein the control lever, when in the first operating mode lies along a reference plane across which the control lever can be swiveled between the operating positions in the first operating mode and when in the second operating mode can be elevated relative to the reference plane, and in the elevated state can be moved like a joystick between the operating positions in the second operating mode. In a preferred embodiment, the at least one pivot device includes a common pivot point for changing the control lever between all of the operating positions. In another embodiment, the at least one pivot device forms a biaxial cardan attachment of the control lever in the console with the two pivot axes thereof intersecting at the common pivot point.

In accordance with another embodiment of the control lever of the present invention, the control device includes a support surface in the console comprising the reference plane across which the control lever can swivel.

In accordance with another embodiment of the control lever of the present invention, the at least one pivot device includes mechanical guide means in the control lever and guide members disposed in the console to control the movements and position of the control lever, the mechanical guide means arranged to interact with the guide means. Preferably, the guide members comprise at least one guide way for each of the operating modes, a secondary guide way extending between at least two of the operating modes and to be held in the selected operating position along the guide ways for each operating mode, and a spring-loaded guide pin arranged to move in at least one of the guide ways.

BRIEF DESCRIPTION OF THE DRAWINGS

In the following detailed description, the present invention will be described in greater detail utilizing an example of an embodiment and with reference to the attached figures, where

FIG. 11 is a side, perspective view of a control lever incorporated in the control device of the present invention;

FIG. 12 is a side, perspective, partially sectional view of a control lever incorporated in the control device of the present invention;

FIG. 13 is a front, perspective view of the pivot component of the present invention; and FIG. 14 is a front, perspective view of the pivot component of the present invention; and FIG. 15 is a side, elevational, sectional view of a guide member incorporated in the device of the present invention.

DETAILED DESCRIPTION

The control device according to the present invention consists in the example shown of a gear control for automatic gearboxes for motor vehicles, where there is also incorporated a function for manual selection of the gear position. The control device can thus be changed between different operating modes or states, as described in greater detail below.

The control device consists as shown in FIGS. 1–5 of a control level 1 and a console 2, in which the control lever is pivoted in order to assume different operating positions, which are to be transferred to different operating states of the device which is to be controlled, in the example shown different gear positions of the automatic gearbox. The control device can be changed between a number of operating modes, in the example shown two operating modes where in each operating mode the lever can be moved between different operating positions. The different operating modes or types of operation and the movement between different operating positions are relative to a three-dimensional co-ordinate system with three geometrical axes x,y,z perpendicular to each other which are indicated in FIGS. 1–5. The different operating modes and operating positions are detected and transferred by special transmission devices, which transfer information about the different operating modes and operating positions to the device which is to be controlled, in this case an automatic gearbox, for changing this over between different operating states. Examples of transmission devices are mechanical cables, linkages, push rods, hydraulics, electrical or optical transmission by means of wires or wireless transmission. Examples of electrical sensors which can detect the modes and positions of the lever are shown and described in International Application No. WO 97/01455.

Figure 1:
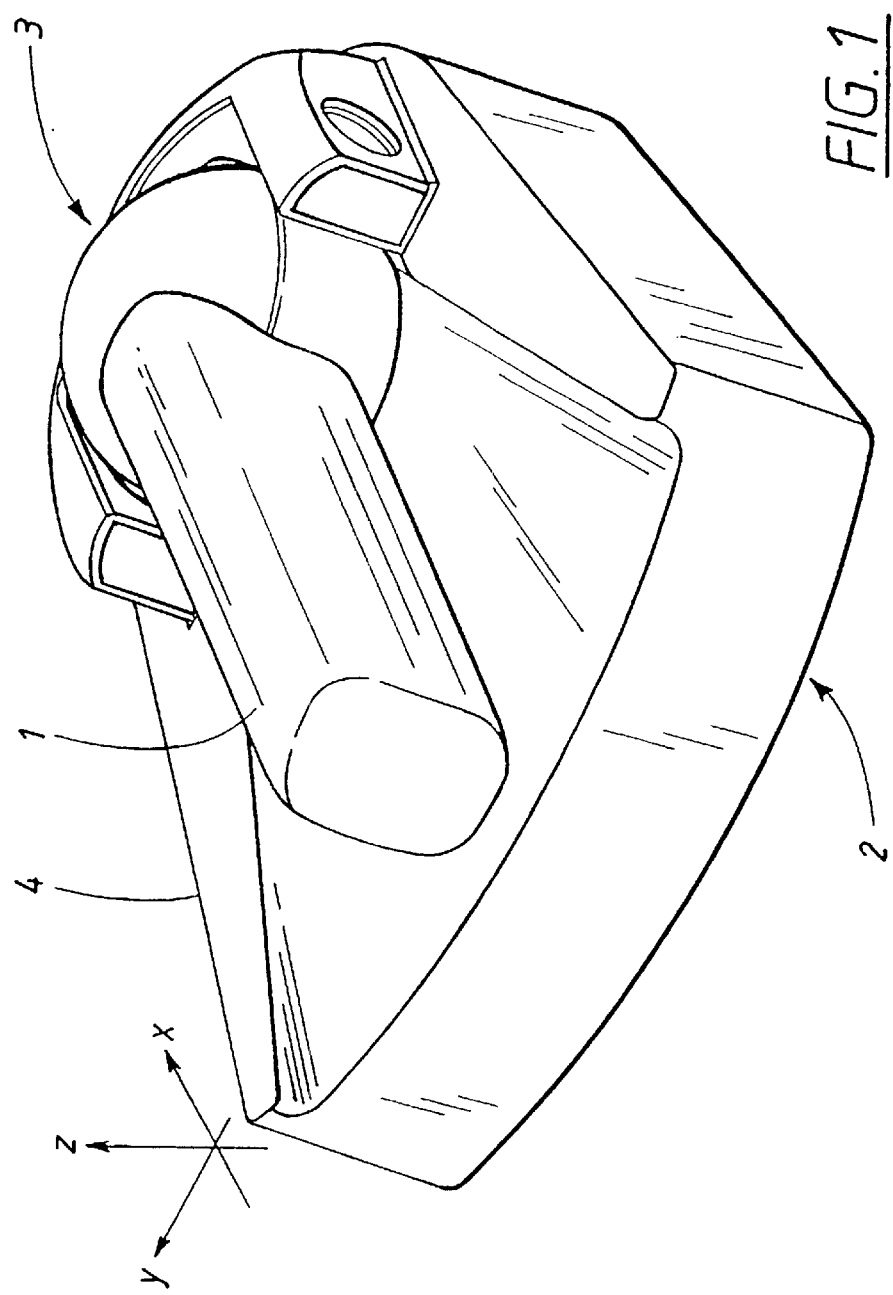
FIG. 1 is a front, perspective view of the control device of the present invention in a first operating mode.
Figure 2:
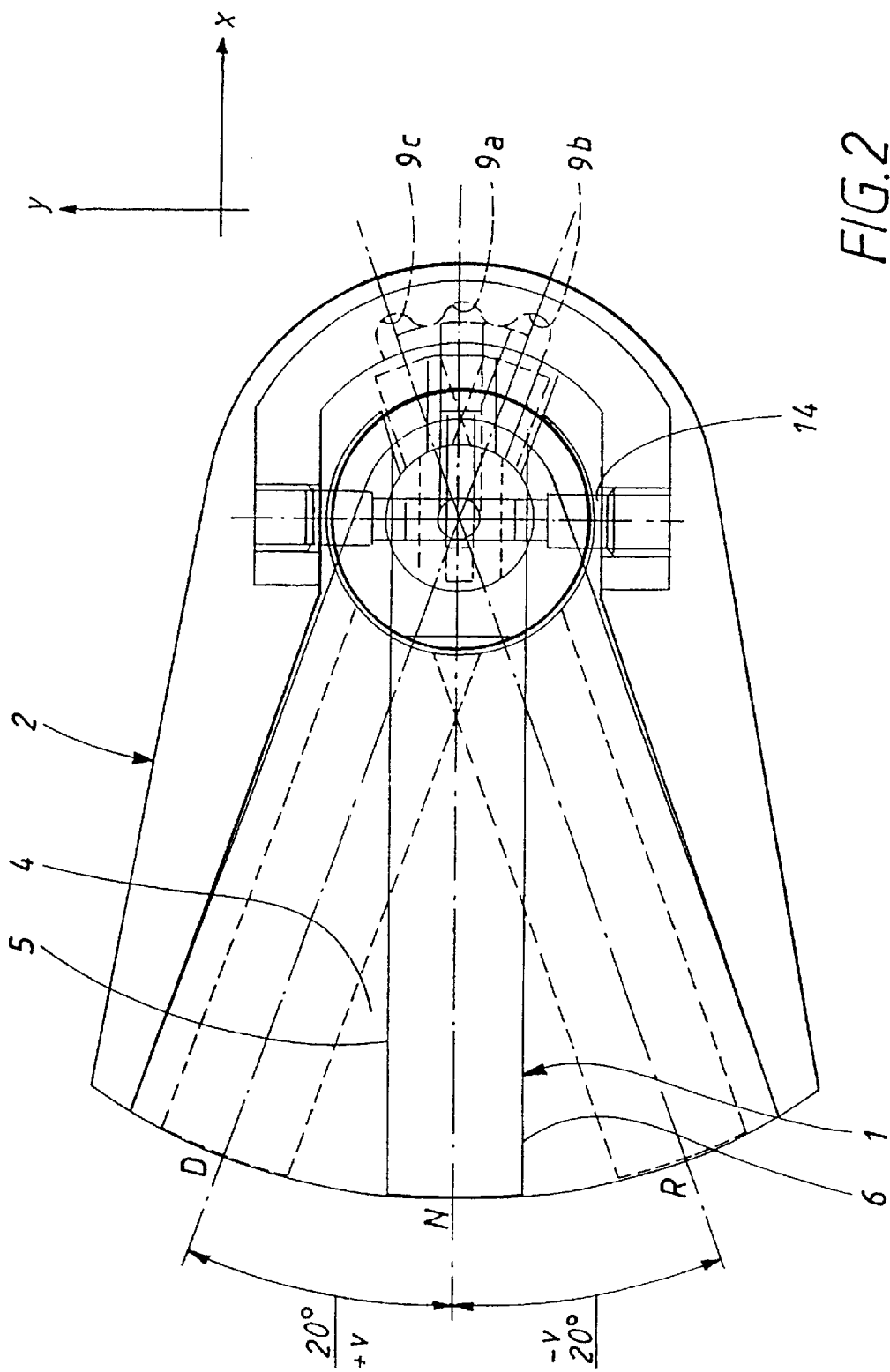
FIG. 2 is a top, elevational view of the control device shown in FIG. 1 in different operating positions in the first operating mode.

The basic idea according to the present invention is to achieve such a clear change of position of the control lever 1 between the different modes that the lever has a distinct character for each mode. Thus in the first operating mode, see FIGS. 1 and 2, the control lever 1 extends principally horizontally, but can alternatively be inclined relative to the x-y plane, which for example can correspond to the horizontal plane of a vehicle. The changing movements of the lever are made possible by means of a pivot device 3 by which the lever is arranged to pivot in the console and to move around predetermined axes in a way which will be described in greater detail below. In the example shown the lever in the first operating mode, according to FIGS. 1 and 2, is horizontal close to a surface 4 which is principally parallel with the x-y plane. By this means the control lever 1 is given rather the character of a handle, where the surface 4 can be regarded as a reference plane for the position of the lever and form a support surface for the hand, with the lever held, for example, between the thumb and index finger by taking hold of two opposite surfaces 5,6 on the lever This first operating mode can, for example, correspond to automatic gear mode, where the automatic gearbox automatically selects the gear position according to the prevalent conditions. In this first automatic gear mode different operating positions can be selected by setting the control lever in different angled positions relative to the x-axis. The position along the x-axis can, for example, correspond to the neutral position N, while turning in a predetermined angle in one direction +v can correspond to the drive position D and turning in a corresponding angle in the opposite direction −v gives the reverse position R. The changing between the different operating positions in this first operating mode is thus carried out by moving the control lever 1 around the z axis.

Figure 3:
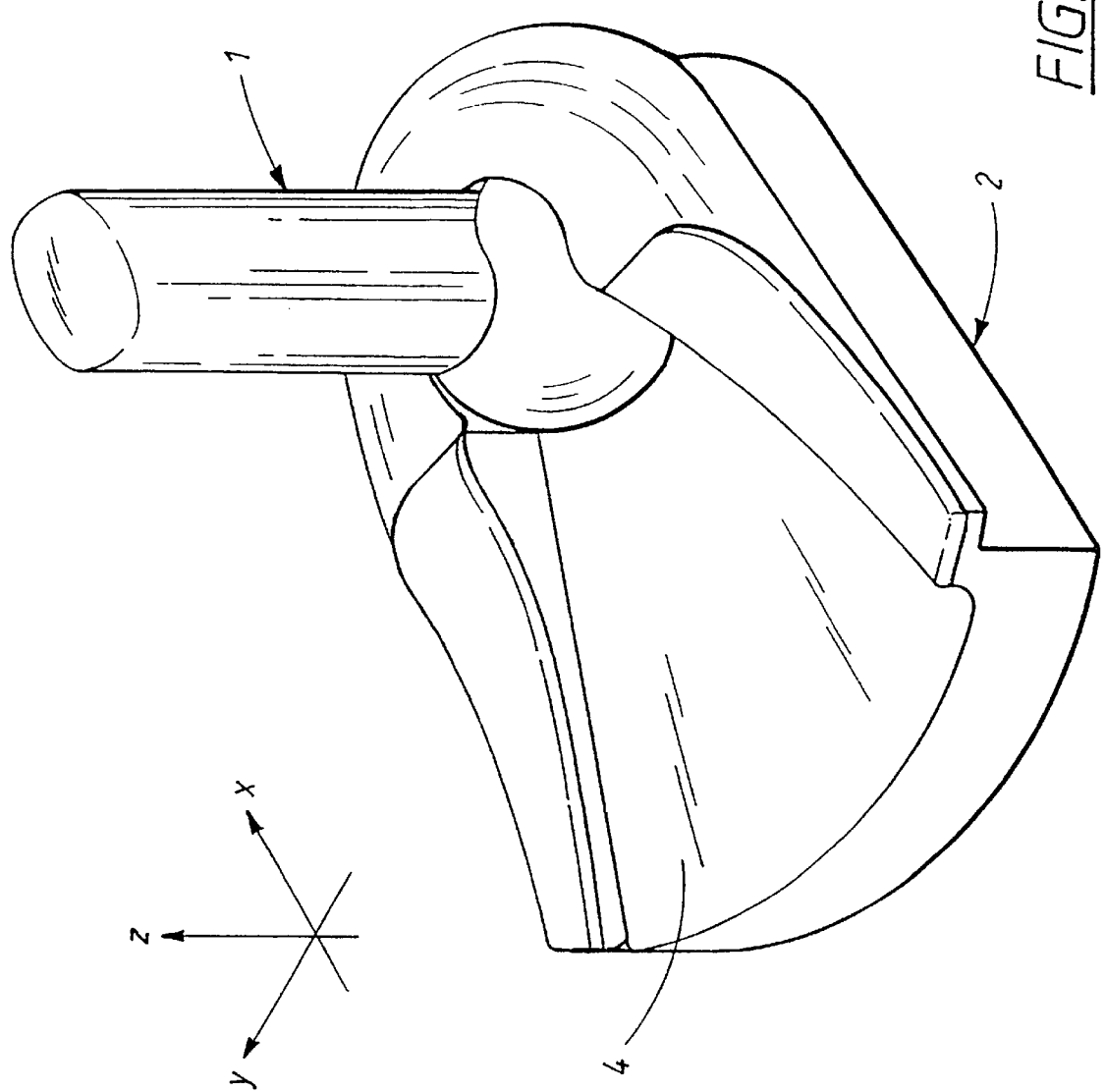
FIG. 3 is a front, perspective view of the control device shown in FIG. 1 in a second operating mode.
Figure 4:
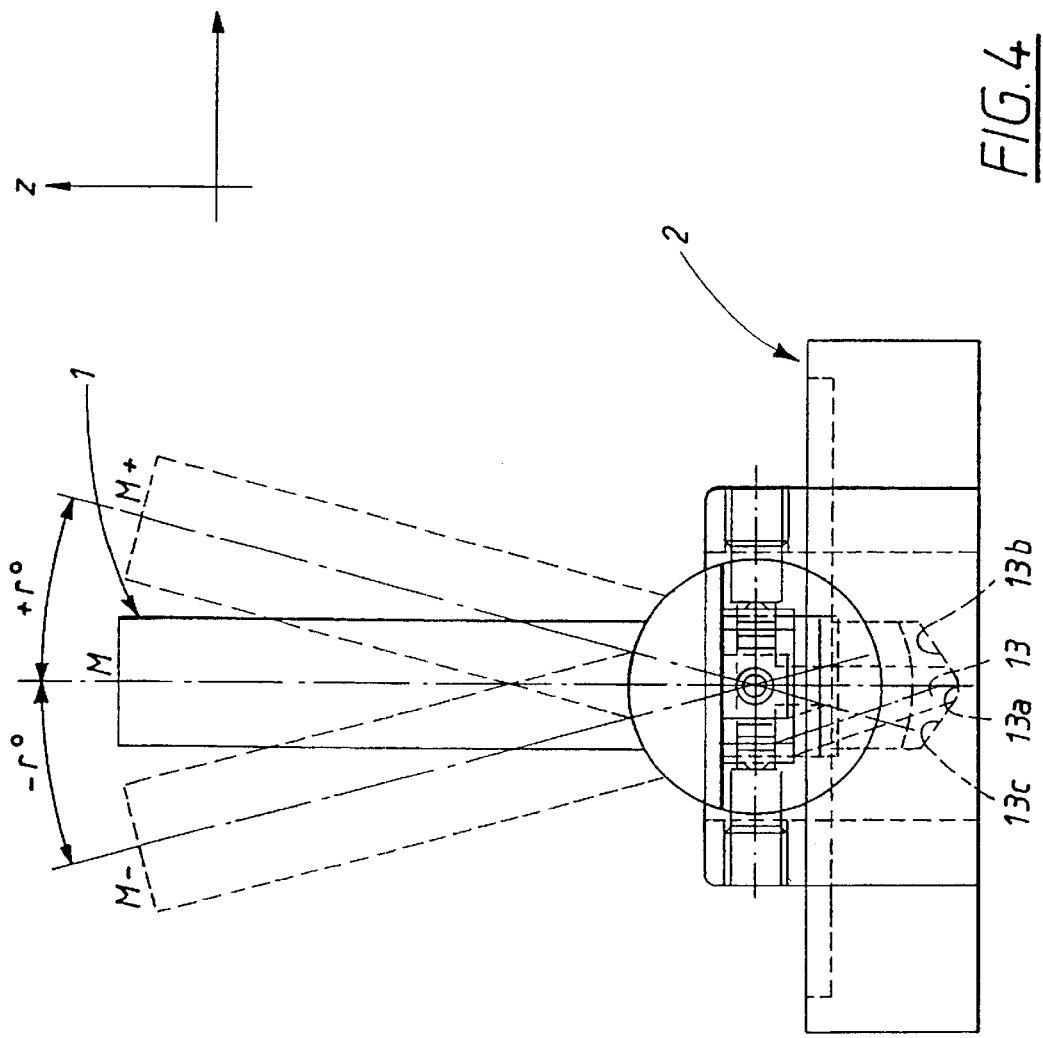
FIG. 4 is a front, elevational view of the control device shown in FIG. 1 in different operating positions in the second operating mode.
Figure 5:
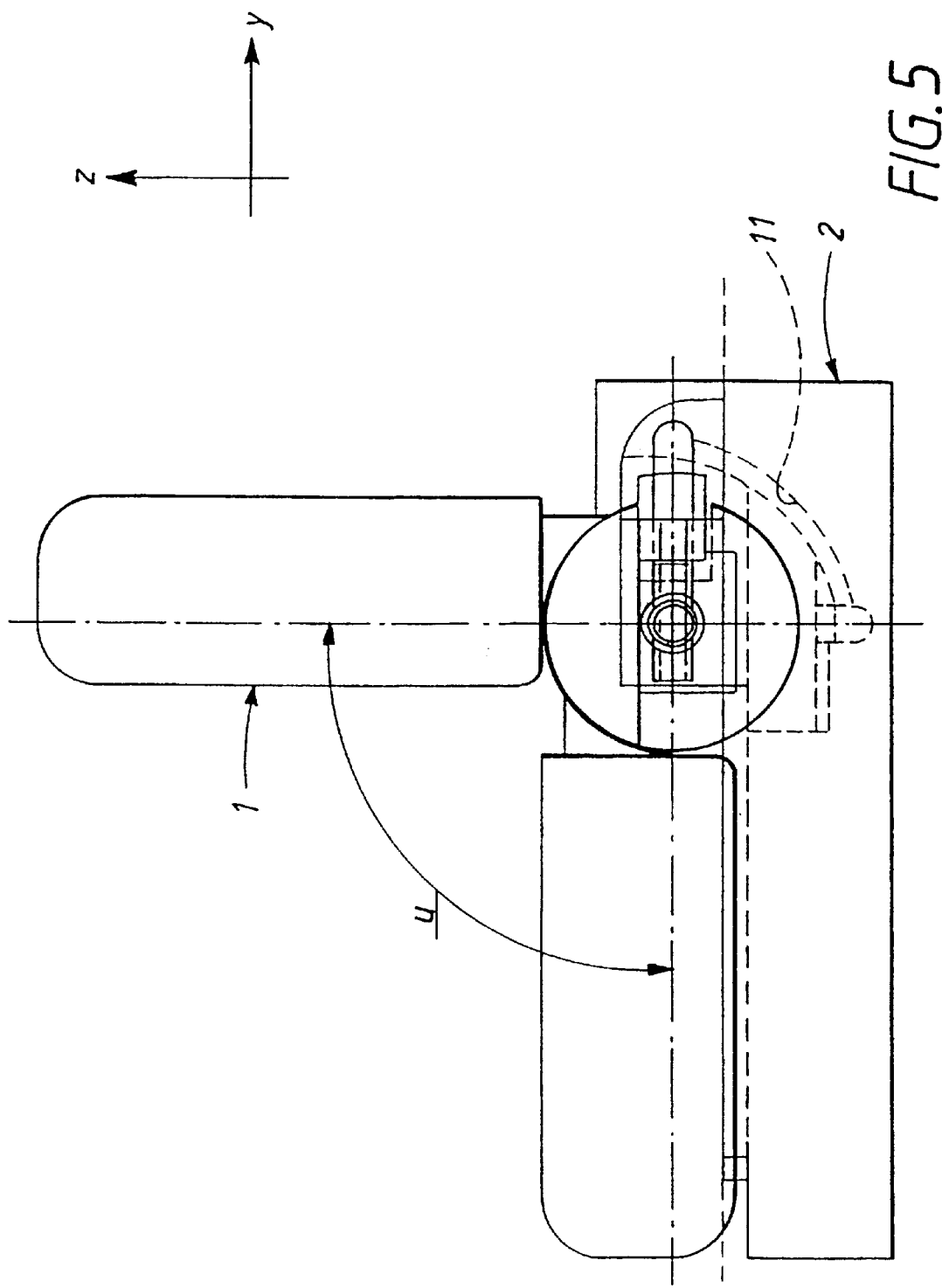
FIG. 5 is a side, elevational view of the control device shown in FIG. 1 in both the first and the second operating mode.

Changing from the first operating mode to the second operating mode which is shown in FIGS. 3 and 4, is carried out as shown in FIG. 5 by pivoting the control lever upwards by the angle u, approx. 90° in the example shown. The movement here takes place in a plane parallel with the x-z plane so that the lever in a neutral position extends principally along the z axis. This changing movement between both operating modes is thus carried out by pivoting the lever around a pivot axis which extends principally in the direction of the y axis. This changing movement is assumed to be carried out from the neutral position in the first operating mode, but can alternatively be carried out from another operating position for example the drive position D, where the movement takes place in a plane angled relative to the x-z plane. In this second operating mode, for example, the automatic gearbox can be changed manually, i.e. the driver can select the time of changing between the different gear positions. This is carried out by pivoting the control lever around a geometric pivot axis which extends in the direction of the y axis, where the lever pivots from a neutral position, for example the upright position M by an angle forwards +r° to position M+ or by an angle −r° to position M−. This change is thus carried out in a plane parallel to the x-z plane. By means which will be described in greater detail below the lever tends to reset itself in the M position and therefore springs back from the position M+ and M−. Each movement from M to position M+ can suitably represent a change up to the next gear, while each movement from M to M− can represent a change down to the next gear.

Figure 6:
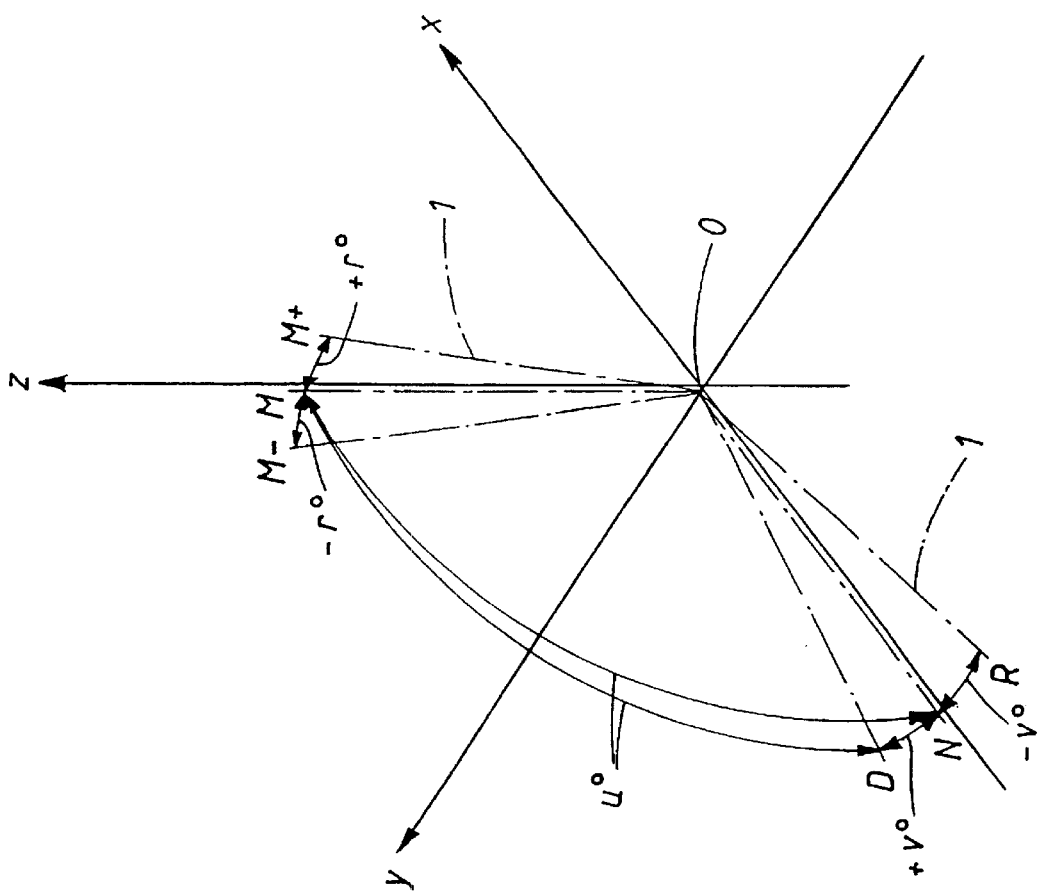
FIG. 6 is a diagrammatical view of the pattern of movement for the control device according to the present invention.

FIG. 6 shows diagrammatically the pattern of movement for the control device by which it can be seen that according to the shown preferred embodiment in all its changing movements the control lever moves around a common pivot point o corresponding to the origin of the co-ordinates.

Figure 7:
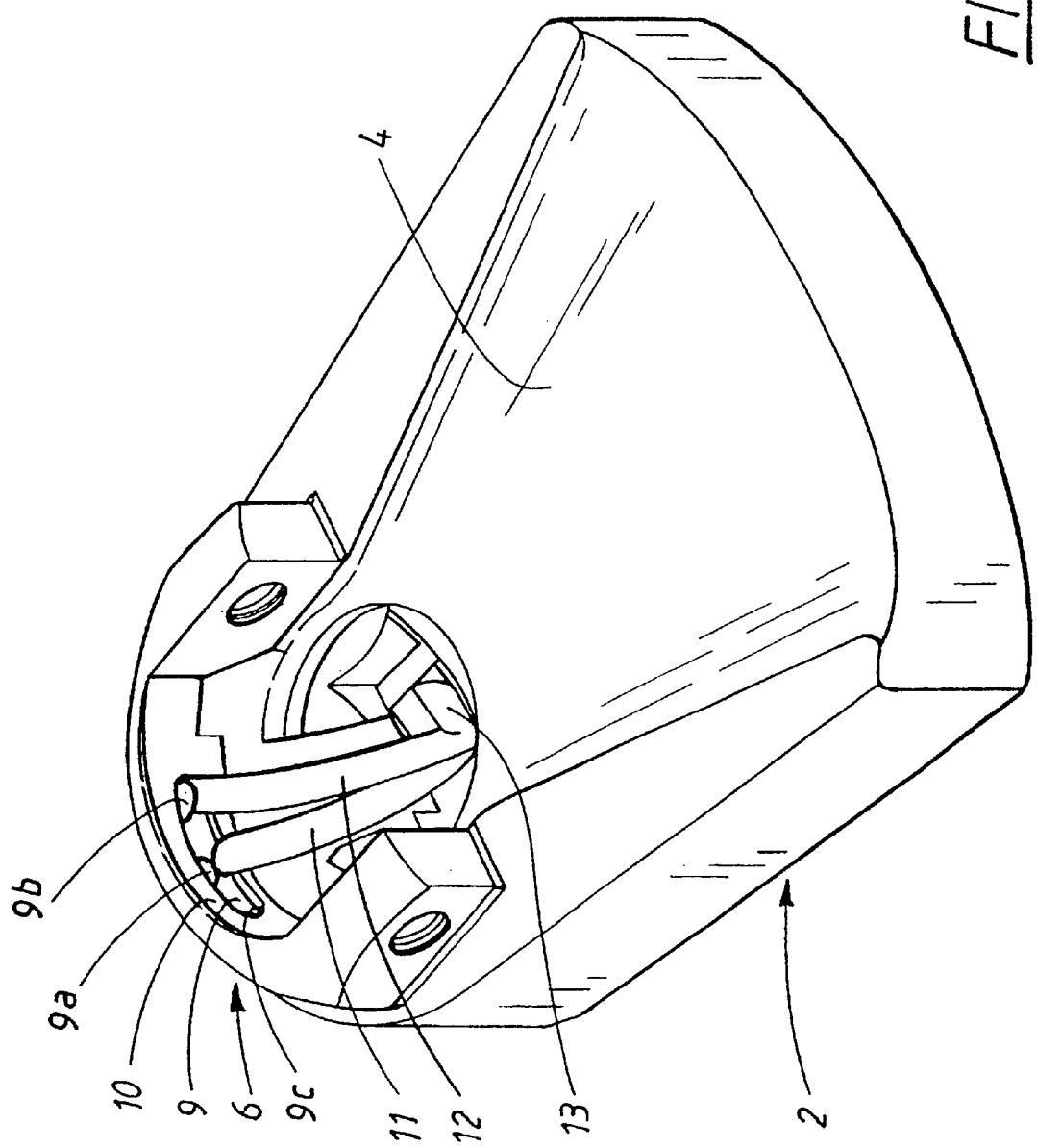
FIG. 7 is a front, perspective view of a console incorporated in the control device of the present invention.
Figure 8:
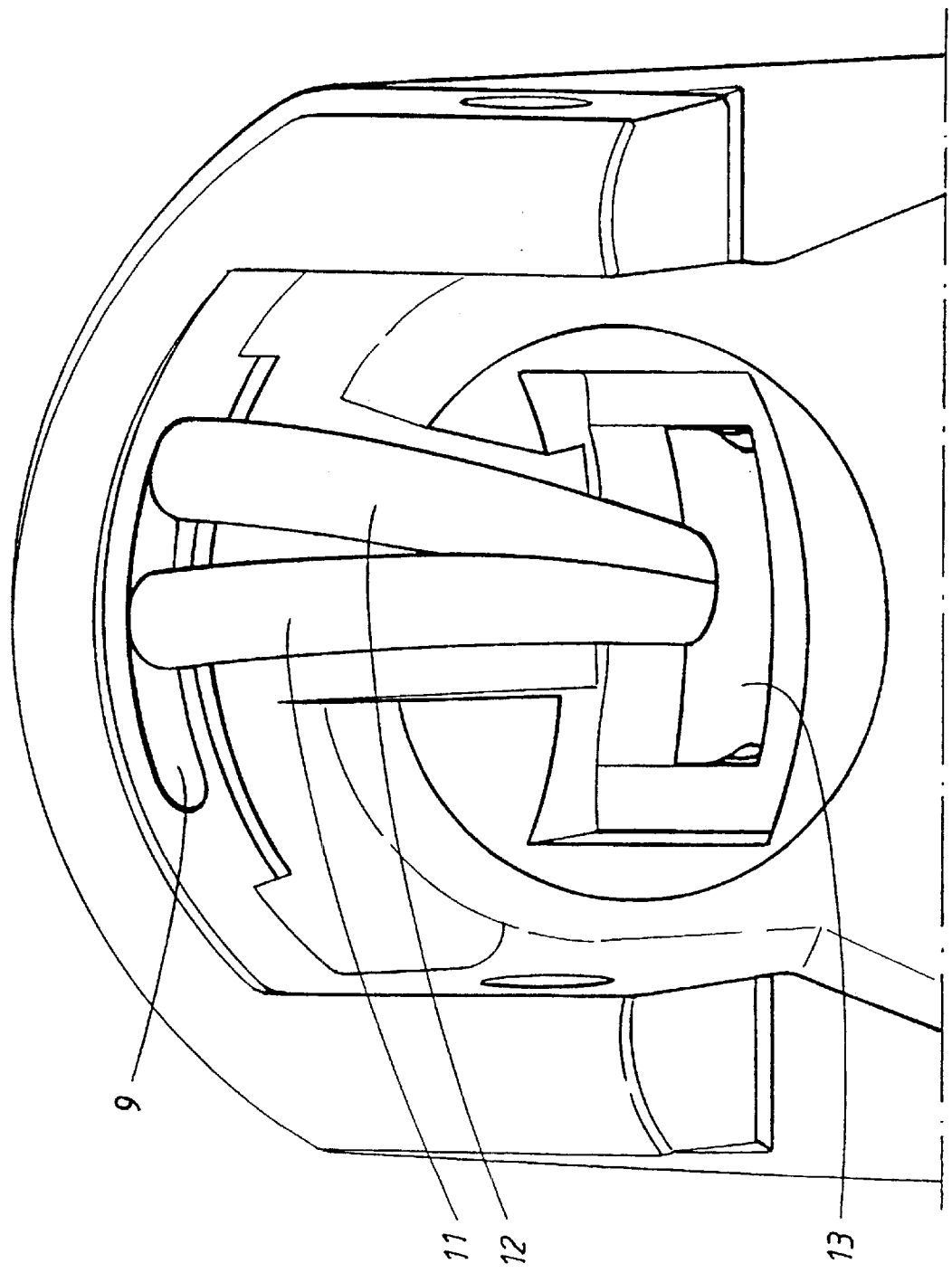
FIG. 8 isa portion of a top, perspective view of the console shown in FIG. 1, in a larger scale.

According to the invention the control lever cannot move freely around its pivot point, but is limited in both direction and extent by guide devices for the movement and position of the control lever. In these guide devices there are a number of guide ways which are shown most clearly in FIGS. 7, 8 and 9 and are arranged in connection with a pivot component 6 in the pivot device 3 in the console 2. The guide ways are intended to interact with a guide arrangement 7 arranged on the control lever 1, which is designed to be fixed in the control lever and to be inserted in the guide ways with a sprung guide pin 8 in order to follow their track. In addition the control lever 1 is kept connected to the console by means of the guide devices.

The guide ways are of three types, a first guide way 9 which has a concave curved track in a concave curved inner surface 10 of the pivot component. The track of the guide way 9 runs principally in a plane parallel with the x-y plane and has a number of index positions 9a, 9b, 9c corresponding to the number of operating positions in the first operating mode. These index positions are constructed in the form of local indents in the guide way 9, for example bowl-shaped indents which are shown most clearly in FIG. 2. The guide way 9 can advantageously have the form of an arc, but other shapes are also possible.

A second type of guide way consists of at least one, in the example shown two guide ways 11, 12 which run with a concave curve from the first guide way 9 down to a third type of guide way, namely a guide way 13, which is arranged in the lower part of the pivot component 6, which surrounds a bowl-shaped space in the console 2. At least one of the guide ways 11, 12 runs in a plane parallel to the x-z plane, while the guide way 12 is angled towards the guide way 11. The third type of guide way 13 is shown most clearly in FIG. 8, but is also shown in FIG. 4. This guide way 13 runs principally in a plane parallel to the y-z plane and has a neutral index position for the position M of the lever in the form of a defined bottom point 13a, from which the guide way 13 has two parts sloping upwards, 13b and 13c. The end of the guide way 13 provides an end stop for the operating movements of the lever in this operating mode. By interaction with the sprung guide device the control lever is thereby caused to reset itself to the position M as mentioned above.

Figure 9:
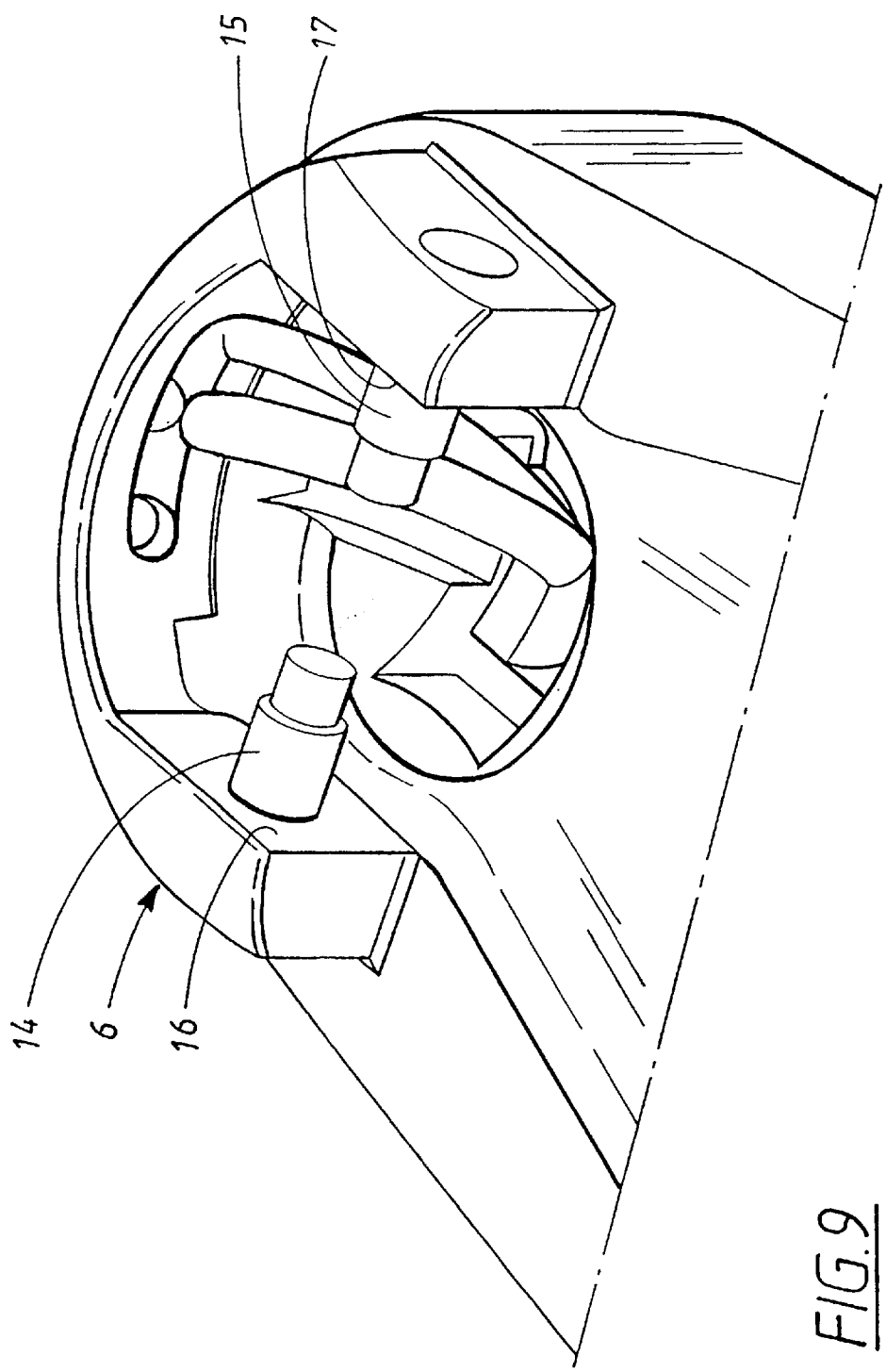
FIG. 9 is a top, perspective view of a corresponding part of the console shown in FIG. 5 with pivot pins arranged in the console.
Figure 10:
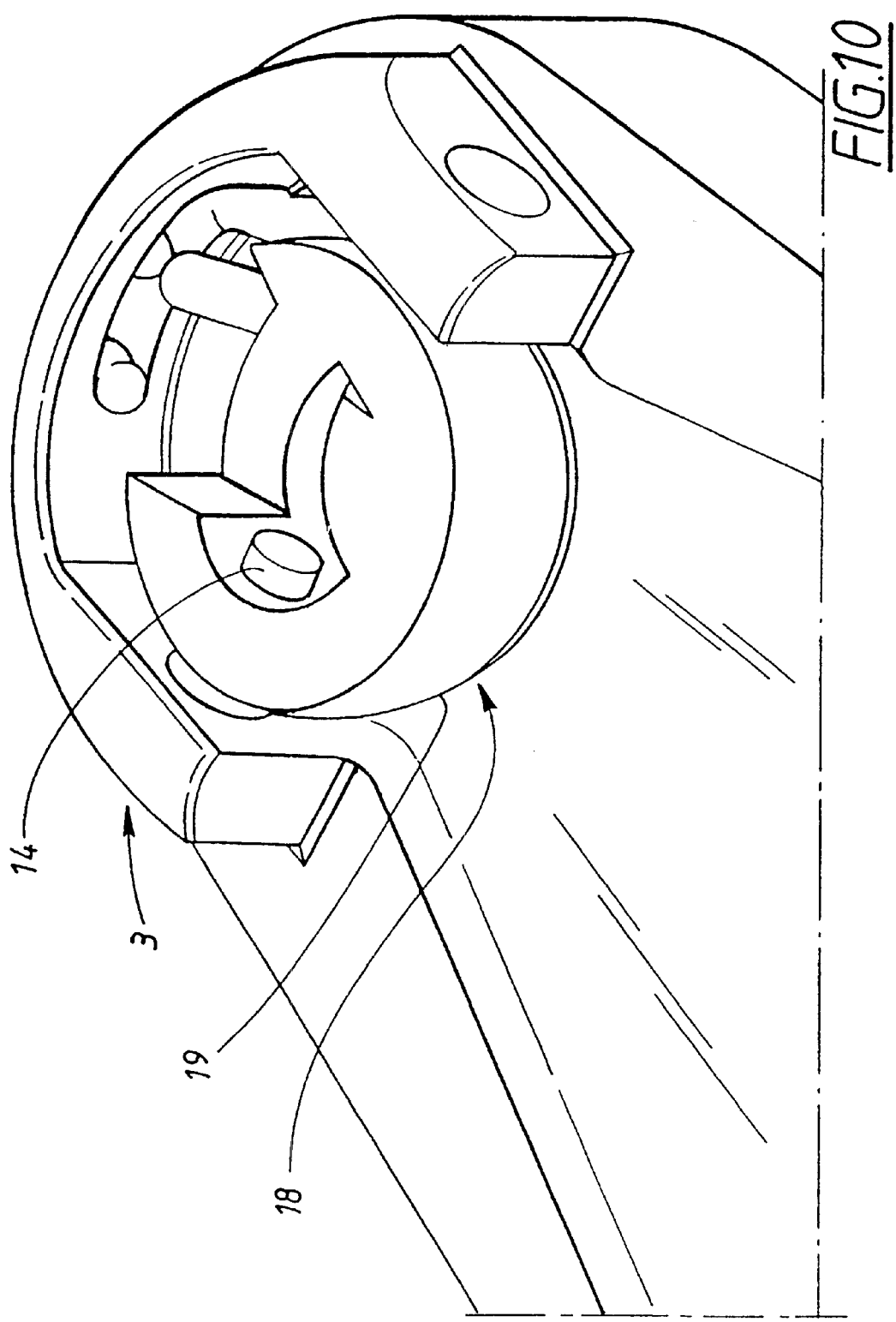
FIG. 10 is a top, perspective view of a portion of the console shown in FIG. 7 with a pivot component arranged in the device.

FIG. 9 shows two pivot pins 14, 15 within the pivot component 6 which project from two walls 16, 17 situated on opposite sides of the pivot component 6. These pivot components form a geometric axis which runs in the y direction of the control device and forms a pivoting attachment around this axis for a second pivot component 18 in the pivot device 3, which second pivot component is principally shaped as a partial sphere, which shape will be described in greater detail below with reference to FIGS. 13 and 14.

FIGS. 11 and 12 show in greater detail an example of the construction of the control lever 1. The control lever has an ergonomically-shaped handle 20 with a first elongated part 21 and a second part 22 which is formed of the end of the control lever. The control lever has in addition a pivot component 23 which forms a third pivot component in the pivot device 3 of the control device. The third pivot component has a spherical part 24, a suitably flat sliding surface 25 from which projects a principally cylindrical part 26 with a cylinder casing shaped sliding surface 27 and an end surface 28 of the cylindrical part. From the cylindrical part there is a projection 29 which is intended to enclose the guide arrangement 7 which, however, is not shown in FIGS. 11 and 12. In the cylindrical part 26 are two locating grooves 26 each arranged to take one of the pivot pins 14 which project through the second spherical part 18.

The second spherical part is, as shown in FIGS. 13 and 14, provided with two diametrically-opposite bearing holes 30, 31 intended to receive the pivot pins 14, 15 for pivoting the pivot component 18 around the y axis, that is the axis for changing between the operating modes. In addition to a spherical outer surface 32 the pivot component has a flat sliding surface 33 arranged to interact with the sliding surface 25 in the control lever 1. The pivot component 18 has a principally cylindrical inner surface 34 arranged to form a sliding surface which interacts with the cylinder casing shaped sliding surface 26 on the control lever. The pivot component 18 has in addition a bottom surface 35 which can be flat and principally correspond to the surface 28 on the control lever. For the sake of tolerances it should, however, be ensured that there is a certain degree of play between these two surfaces. In addition the pivot component has a first cut-out 36 which is arranged to permit movement of part 37 of the guide pin 8 which is part of the guide arrangement 7. A cut-out 39 through the pivot component 18 makes space for the part 29 of the control lever 1 and forms force-absorbing stop surfaces 39, 40 interacting with surfaces on the part 29 in the lever 1.

The pivot arrangement 3 described above forms thus a biaxial cardan attachment in the console 2 where the pivot movements or turning movements and positions of the lever are determined by interaction between the guide arrangement 7 and the guide ways 9–13 in the console described above. As mentioned above the guide arrangement 7 is sprung which is carried out in the example shown in FIG. 15 by means of a pressure spring 41 which is shown diagrammatically in the figure and held between seating surfaces partly in a cavity 42 in which the guide pin can move like a piston in a tube, see also FIG. 12, and partly in the pin.

The invention is not restricted to the embodiments described above and shown in the figures, but can be varied in several ways within the scope of the following patent claims. For example, the pivot device 3 can be designed in different ways. It is possible for the pivot device to be designed as a ball which is housed in a spherical socket in the console, where a spring-loaded guide arrangement is arranged either in the ball or in the socket, where the guide ways are arranged in the opposite element. In many control devices of the gear lever type for automatic gearboxes the parking position is an operating position. This can for example be carried out by a third operating mode and can be adopted by depressing the lever 1 from the neutral position along the x-axis in a recess in the support surface 4. The lever is then caused to pivot around the y axis in order to be locked in the parking position p. This movement is made possible by a fourth guide way being added, which is suitably carried out by an upwards extension of the guide way 11, which part is terminated by a stop position in the form of an indent.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and the scope of the present invention as defined by the appended claims.

What is claimed is:

1. A control device, comprising a console, a control lever mounted on said console, at least one pivot device enabling said control lever to pivot relative to said console to change between a number of operating positions where the operating positions of the control lever around said at least one pivot device are intended to be transferred to a corresponding operating state of a device which is to be controlled, said operating positions comprising at least two different operating modes, including a first operating mode in which the position of said control lever can be changed by moving said control lever between a first plurality of operating positions, and a second operating mode in which the position of said control lever can be changed by moving said control lever between a second plurality of operating positions, and wherein said control lever, when in said first operating mode, lies along a reference plane across which said control lever can be swiveled between the operating positions in said first operating mode and when in said second operating mode can be elevated relative to said reference plane, and in said elevated state can be moved like a joystick between the operating positions in said second operating mode.

2. A control device according to claim 1, wherein said at least one pivot device includes a common pivot point for changing said control lever between all of said operating positions.

3. A control device according to claim 2, wherein said at least one pivot device forms a biaxial cardan attachment of said control lever in said console with the two pivot axes thereof intersecting at said common pivot point.

4. A control device according to claim 1, including a support surface in said console comprising said reference plane across which said control lever can swivel.

5. A control device according to claim 1, wherein said at least one pivot device includes mechanical guide means in said control lever, and guide members disposed in said console to control the movements and position of said control lever, said mechanical guide means arranged to interact with said guide members.

6. A control device according to claim 5, wherein said guide members comprise at least one guide way for each of said operating modes, a secondary guide way extending between at least two of said operating modes and to be held in the selected operating position along the guide ways for each operating mode, and a spring-loaded guide pin arranged to move in at least one of said guide ways.

* * * * *